United States Patent
Zanetti et al.

(10) Patent No.: US 10,682,835 B2
(45) Date of Patent: Jun. 16, 2020

(54) SHRINK FILMS, AND METHODS OF MAKING THEREOF

(71) Applicants: PBBPolisur S.R.L., Buenos Aires (AR); Dow Global Technologies LLC, Midland, MI (US); Dow Quimica De Colombia S.A., Bogota (CO)

(72) Inventors: Maximiliano Zanetti, Pcia Buenos Aires (AR); Guillermo A. Raimondi, Ciudad Autonoma BsAs (AR); Jorge C. Gomes, Sao Paulo (BR); Miguel A. Molano Niampira, Bogota (CO)

(73) Assignees: PBBPolisur S.R.L., uenos Aries (AR); Dow Global Technologies LLC, Midland, MI (US); Dow Quimica de Colombia S.A., Bogota (CO)

( * ) Notice: Subject to any disclaimer, the term of this patent is extended or adjusted under 35 U.S.C. 154(b) by 197 days.

(21) Appl. No.: 15/764,515

(22) PCT Filed: Sep. 9, 2016

(86) PCT No.: PCT/US2016/050966
§ 371 (c)(1),
(2) Date: Mar. 29, 2018

(87) PCT Pub. No.: WO2017/058493
PCT Pub. Date: Apr. 6, 2017

(65) Prior Publication Data
US 2018/0272678 A1    Sep. 27, 2018

Related U.S. Application Data

(60) Provisional application No. 62/234,111, filed on Sep. 29, 2015.

(51) Int. Cl.

| B32B 7/02 | (2019.01) |
|---|---|
| B32B 27/32 | (2006.01) |
| B29C 48/10 | (2019.01) |
| B29C 48/00 | (2019.01) |
| B29C 48/21 | (2019.01) |
| B29C 48/88 | (2019.01) |
| B32B 27/08 | (2006.01) |
| B29K 23/00 | (2006.01) |
| B29L 31/00 | (2006.01) |

(52) U.S. Cl.
CPC .......... *B32B 27/32* (2013.01); *B29C 48/0018* (2019.02); *B29C 48/022* (2019.02); *B29C 48/10* (2019.02); *B29C 48/21* (2019.02); *B29C 48/912* (2019.02); *B32B 7/02* (2013.01); *B32B 27/08* (2013.01); B29K 2023/0625 (2013.01); B29K 2023/0633 (2013.01); B29K 2995/0049 (2013.01); B29L 2031/712 (2013.01); B32B 2250/03 (2013.01); B32B 2250/242 (2013.01); B32B 2250/40 (2013.01); B32B 2270/00 (2013.01); B32B 2307/51 (2013.01); B32B 2307/736 (2013.01); B32B 2323/046 (2013.01); B32B 2553/00 (2013.01)

(58) Field of Classification Search
CPC ... B29C 48/0018; B29C 48/022; B29C 48/10; B29C 48/21; B29C 48/912; B29K 2023/0625; B29K 2023/0633; B29K 2995/0049; B29L 2031/712; B32B 2250/03; B32B 2250/242; B32B 2250/40; B32B 2270/00; B32B 2307/51; B32B 2307/736; B32B 2323/046; B32B 2553/00; B32B 27/08; B32B 27/32; B32B 7/02
See application file for complete search history.

(56) References Cited

U.S. PATENT DOCUMENTS

| 3,645,992 A | 2/1972 | Dow |
|---|---|---|
| 3,914,342 A | 10/1975 | Mitchell |
| 4,076,698 A | 2/1978 | Anderson et al. |
| 4,352,915 A | 10/1982 | Mashita et al. |
| 4,599,392 A | 7/1986 | McKinney et al. |
| 5,272,236 A | 12/1993 | Lai et al. |
| 5,278,272 A | 1/1994 | Lai et al. |

(Continued)

FOREIGN PATENT DOCUMENTS

| JP | 2012183732 A | 9/2012 |
|---|---|---|
| WO | 2006045501 A1 | 5/2006 |
| WO | 2008104371 A2 | 9/2008 |

OTHER PUBLICATIONS

Randall, (Rev. Macromol. Chem. Phys., C29 (2&3), p. 285-297).

(Continued)

*Primary Examiner* — Lawrence D Ferguson

(57) ABSTRACT

A multilayer shrink film comprising a first layer, a second layer, and a third layer, wherein the second layer is positioned between the first layer and the third layer, and wherein the second layer comprises a second polymer blend, the second polymer blend comprising from 0 to 60 wt. %, based on the total polymer weight in the second polymer blend, of a low density polyethylene, and from 40 to 100 wt. %, based on the total polymer weight in the second polymer blend, of an ethylene/α-olefin interpolymer composition having a density in the range of from 0.860 g/cc to 0.910 g/cc, a melt index ($I_2$) in a range of from 0.1 to 5 g/10 minutes, a molecular weight distribution ($M_w/M_n$) in the range of from 1.8 to 3.5, and a Comonomer Distribution Constant (CDC) in the range of from 95 to 200.

11 Claims, No Drawings

(56) References Cited

U.S. PATENT DOCUMENTS

| | | |
|---|---|---|
| 5,582,923 A | 12/1996 | Kale et al. |
| 5,614,315 A | 3/1997 | Kondo et al. |
| 5,733,155 A | 3/1998 | Sagawa et al. |
| 5,854,045 A | 12/1998 | Fang et al. |
| 5,925,448 A | 7/1999 | Moy et al. |
| 6,445,642 B2 | 9/2002 | Murakami |
| 6,486,284 B1 | 11/2002 | Karande et al. |
| 6,521,338 B1 | 2/2003 | Maka |
| 6,982,311 B2 | 1/2006 | Karande et al. |
| 7,247,680 B2 | 7/2007 | Marechal |
| 7,498,282 B2 | 3/2009 | Patel et al. |
| 7,776,987 B2 | 8/2010 | Oswald et al. |
| 8,173,232 B2 | 5/2012 | Mandare et al. |
| 8,327,931 B2 | 12/2012 | Agrawal et al. |
| 8,372,931 B2 | 2/2013 | Hermel-Davidock et al. |
| 8,829,115 B2 | 9/2014 | Hermel-Davidock et al. |
| 8,916,667 B2 | 12/2014 | Karjala et al. |
| 9,068,032 B2 | 6/2015 | Karjala et al. |
| 9,803,295 B2 | 10/2017 | Patel et al. |
| 10,287,074 B2 | 5/2019 | Niedersuess et al. |
| 10,343,367 B2 | 7/2019 | Brunner et al. |
| 2004/0054097 A1 | 3/2004 | Maehling et al. |
| 2008/0280517 A1 | 11/2008 | Chang et al. |
| 2009/0286024 A1 | 11/2009 | Lu |
| 2010/0316869 A1 | 12/2010 | Shelley et al. |
| 2011/0039082 A1 | 2/2011 | Yun et al. |
| 2014/0179873 A1* | 6/2014 | Lam .................. C08L 23/06 525/240 |
| 2014/0255674 A1 | 9/2014 | Tice et al. |
| 2015/0132514 A1 | 5/2015 | Wang et al. |

OTHER PUBLICATIONS

Zimm, B. H. and Stockmayer, W. H., J. Chem. Phys., 17, 1301-1314 (1949).
Rudin, A., Modern Methods of Polymer Characterization, John Wiley & Sons, New York (1991) pp. 103-112.
Williams and Ward, J. Polym. Sci., Polym. Let., 6, 621 (1968).
PCT/US2016/050966, International Search Report and Written Opinion dated Dec. 1, 2016.
PCT/US2016/050966, International Preliminary Report on Patentability dated Apr. 3, 2018.

* cited by examiner

SHRINK FILMS, AND METHODS OF MAKING THEREOF

FIELD

Embodiments of the present disclosure generally relate to polyethylene-based shrink films, and more particularly, to polyethylene-based shrink films having improved elasticity, and methods of making thereof.

BACKGROUND

The shrink packaging generally involves wrapping an article(s) in a shrink film to form a package, and then heat shrinking the film by exposing it to sufficient heat to cause shrinkage and intimate contact between the film and article. The heat can be provided by conventional heat sources, such as heated air. In some instances, a shrink film may elongate when the items bundled are moved, but fail to return to its original length. This can result in reduced tension for keeping items bundled together.

Accordingly, alternative polyethylene-based shrink films having improved elasticity are desired.

SUMMARY

Disclosed in embodiments herein are multilayer shrink films. The multilayer shrink films comprise a first layer comprising a first polymer blend, the first polymer blend comprising from 50 to 90 wt. % of a low density polyethylene having a density from 0.910 to 0.930 g/cc and an $I_2$ from 0.1 to 10 g/10 min, and from 10 wt. % to 50 wt. % linear low density polyethylene having a density from 0.910 to 0.940 g/cc and an $I_2$ from 0.5 to 10 g/10, based on the total polymer weight in the first polymer blend; a second layer comprising a second polymer blend, the second polymer blend comprising from 0 to 60 wt. %, based on the total polymer weight in the second polymer blend, of a low density polyethylene having a density from 0.910 to 0.930 g/cc and an $I_2$ from 0.1 to 10 g/10, and from 40 to 100 wt. %, based on the total polymer weight in the second polymer blend, of an ethylene/α-olefin interpolymer composition having a density in the range of from 0.860 g/cc to 0.910 g/cc, a melt index ($I_2$) in a range of from 0.1 to 5 g/10 minutes, a molecular weight distribution ($M_w/M_n$) in the range of from 1.8 to 3.5, and a Comonomer Distribution Constant (CDC) in the range of from 95 to 200; and a third layer comprising a third polymer blend, the third polymer blend comprising from 50 to 90 wt % of a low density polyethylene having a density from 0.910 to 0.930 g/cc and an $I_2$ from 0.1 to 10 g/10 min; and from 10 wt % to 50 wt % linear low density polyethylene having a density from 0.910 to 0.940 g/cc and an $I_2$ from 0.5 to 10 g/10, based on the total polymer weight in the third polymer blend; wherein the second layer is positioned between the first layer and the third layer.

Also disclosed in embodiments herein are methods of making a multilayer shrink film. The method comprises co-extruding a first polymer blend, second polymer blend, and third polymer blend in an extruder to form a tube having a first layer formed from the first polymer blend, second layer formed from the second polymer blend, and third layer formed from the third polymer blend; and cooling the tube to form a multilayer shrink film; wherein the first polymer blend comprises from 50 to 90 wt. % of a low density polyethylene having a density from 0.910 to 0.930 g/cc and an $I_2$ from 0.1 to 10 g/10 min, and from 10 wt. % to 50 wt. % linear low density polyethylene having a density from 0.910 to 0.940 g/cc and an $I_2$ from 0.5 to 10 g/10, based on the total polymer weight in the first polymer blend; the second polymer blend comprises from 0 to 60 wt. %, based on the total polymer weight in the second polymer blend, of a low density polyethylene having a density from 0.910 to 0.930 g/cc and an $I_2$ from 0.1 to 10 g/10, and from 40 to 100 wt. %, based on the total polymer weight in the second polymer blend, of an ethylene/α-olefin interpolymer composition having a density in the range of from 0.860 g/cc to 0.910 g/cc, a melt index ($I_2$) in a range of from 0.1 to 5 g/10 minutes, a molecular weight distribution ($M_w/M_n$) in the range of from 1.8 to 3.5, and a Comonomer Distribution Constant (CDC) in the range of from 95 to 200; and the third polymer blend comprises from 50 to 90 wt % of a low density polyethylene having a density from 0.910 to 0.930 g/cc and an $I_2$ from 0.1 to 10 g/10 min; and from 10 wt % to 50 wt % linear low density polyethylene having a density from 0.910 to 0.940 g/cc and an $I_2$ from 0.5 to 10 g/10, based on the total polymer weight in the third polymer blend; and wherein the second layer is positioned between the first layer and the third layer.

Additional features and advantages of the embodiments will be set forth in the detailed description which follows, and in part will be readily apparent to those skilled in the art from that description or recognized by practicing the embodiments described herein, including the detailed description and the claims. It is to be understood that both the foregoing and the following description describe various embodiments and are intended to provide an overview or framework for understanding the nature and character of the claimed subject matter.

DETAILED DESCRIPTION

Reference will now be made in detail to embodiments of multilayer shrink films, and methods thereof. The multilayer shrink films may be used in the packaging of multiple articles. It is noted, however, that this is merely an illustrative implementation of the embodiments disclosed herein. The embodiments are applicable to other technologies that are susceptible to similar problems as those discussed above. For example, the multilayer shrink films described herein may be used in other flexible packaging applications, such as, heavy duty shipping sacks, liners, sacks, stand-up pouches, detergent pouches, sachets, etc., all of which are within the purview of the present embodiments.

The multilayer shrink films described herein are polyethylene-based or ethylene-based. The term "polyethylene-based" or "ethylene-based," are used interchangeably herein to mean that the film contains greater than 50 wt. %, at least 60 wt. %, at least 70 wt. %, at least 75 wt. %, at least 80 wt. %, at least 85 wt. %, at least 90 wt. %, at least 95 wt. %, at least 99 wt. %, at least 100 wt. %, based on the total polymer weight present in the films, of polyethylene polymers.

In embodiments herein, the multilayer shrink films comprise a first layer, a second layer, and a third layer. The second layer is positioned between the first layer and the third layer. The first and third layers may be the same or different, and may have an ABA film structure, where A indicates that the first and third layers are the same in the composition, or an ABC film structure, where A and C indicated that the first and third layers are different in composition. In either configuration (ABA or ABC), the first and third layers may have an equal thickness, or alternatively, may have an unequal thickness.

The multilayer shrink films described herein may have a film thickness of 100 microns or less. All individual values and subranges are included and disclosed herein. For example, in some embodiments, the multilayer films described herein may have a film thickness ranging from 20 to 75 microns, from 20 to 72 microns, from 25 to 72 microns, from 25 to 70 microns, or from 30 to 70 microns. While there is no minimum thickness contemplated for the multilayer films of the present invention, practical considerations of current manufacturing equipment suggests that the minimum thickness will be at least 8 microns.

The first layer and the third layer may independently have a thickness that is from 5-25 percent of the overall thickness of the multilayer shrink film. In some embodiments, the first layer and the third layer may independently have a thickness that is from 10-25 percent, 15-25 percent, or 20-25 percent of the overall thickness of the multilayer shrink film. The second layer has a thickness that is from 50-90 percent of the overall thickness of the multilayer shrink film. In some embodiments, the second layer has a thickness that is from 50-85 percent, 50-80 percent, 50-75 percent, 50-70 percent, or 50-65 percent of the overall thickness of the multilayer shrink film. In other embodiments, the second layer has a thickness that is from 55-90 percent, 60-90 percent, 65-90 percent, 70-90 percent, or 75-90 percent of the overall thickness of the multilayer shrink film.

The thickness ratio of the first layer and the third layer to the second layer can be any ratio suitable to maintain the optical and mechanical properties of a shrink film. In some embodiments, the thickness ratio of the first layer and the third layer to the second layer may be 1:5 to 1:1, 1:4 to 1:1, 1:3 to 1:1, 1:2 to 1:1, or 1:1.5 to 1:1.

First Layer & Third Layer

The first layer comprises a first polymer blend. The first polymer blend comprises from 50 to 90 wt. % of a low density polyethylene and from 10 to 50 wt. % of a linear low density polyethylene, based on the total polymer weight in the first polymer blend. All individual values and subranges described above are included and disclosed herein. For example, the first polymer blend may comprise 55 to 90 wt. %, 55 to 85 wt. %, 55 to 80 wt. %, or 55 to 75 wt. %, of the low density polyethylene and from 15 to 50 wt. %, 20 to 50 wt. %, 25 to 50 wt. %, or 30 to 50 wt. % of the linear low density polyethylene. In some embodiments herein, the first polymer blend may also include LDPE/LDPE/LLDPE blends where one of the LDPE resins has, for example, a relatively higher melt index and the other has, for example, a lower melt index and is more highly branched. In other embodiments, the first polymer blend may also include LLDPE/LLDPE/LDPE blends, as well as other combinations useful in a heat shrinkable film.

The third layer comprises a third polymer blend. The third polymer blend comprises from 50 to 90 wt. % of a low density polyethylene and from 10 to 50 wt. % of a linear low density polyethylene, based on the total polymer weight in the third polymer blend. All individual values and subranges described above are included and disclosed herein. For example, the third polymer blend may comprise 55 to 90 wt. %, 55 to 85 wt. %, 55 to 80 wt. %, or 55 to 75 wt. %, of the low density polyethylene and from 15 to 50 wt. %, 20 to 50 wt. %, 25 to 50 wt. %, or 30 to 50 wt. % of the linear low density polyethylene. In some embodiments herein, the third polymer blend may also include LDPE/LDPE/LLDPE blends where one of the LDPE resins has, for example, a relatively higher melt index and the other has, for example, a lower melt index and is more highly branched. In other embodiments, the third polymer blend may also include LLDPE/LLDPE/LDPE blends, as well as other combinations useful in a heat shrinkable film. As previously described herein, the first polymer blend and the third polymer blend may have the same composition or may have a different composition.

Second Layer

The second layer comprises a second polymer blend. The second polymer blend comprises from 0 to 60 wt. % of a low density polyethylene and from 40 to 100 wt. % of an ethylene/α-olefin interpolymer composition. All individual values and subranges described above are included and disclosed herein. For example, the second polymer blend may comprise 5 to 60 wt. %, 10 to 60 wt. %, 15 to 55 wt. %, 20 to 55 wt. %, 20 to 50 wt. %, 25 to 50 wt. %, or 30 to 50 wt. %, of the low density polyethylene and from 40 to 99 wt. %, 40 to 95 wt. %, 40 to 90 wt. %, 40 to 85 wt. %, 40 to 80 wt. %, 40 to 75 wt. %, 40 to 70 wt. %, or 45 to 65 wt. % of the ethylene/α-olefin interpolymer composition. In some embodiments herein, the second polymer blend may also include LDPE/LDPE/interpolymer blends where one of the LDPE resins has, for example, a relatively higher melt index and the other has, for example, a lower melt index and is more highly branched.

Low Density Polyethylene (LDPE)

The low density polyethylene may have a density of from 0.910 g/cc to 0.930 g/cc. All individual values and subranges are included and disclosed herein. For example, in some embodiments, the low density polyethylene may have a density of from 0.912 g/cc to 0.930 g/cc, 0.915 g/cc to 0.930 g/cc, 0.915 g/cc to 0.927 g/cc, 0.917 g/cc to 0.930 g/cc, 0.917 g/cc to 0.927 g/cc, or 0.919 g/cc to 0.925 g/cc. The low density polyethylene may have a melt index, or I2, of from 0.1 g/10 min to 10 g/10 min. All individual values and subranges are included and disclosed herein. For example, in some embodiments, the low density polyethylene may have a melt index from 0.1 to 7 g/10 min, 0.1 to 5 g/10 min, 0.1 to 4 g/10 min, 0.1 to 3.5 g/10 min, 0.1 to 3 g/10 min, 0.1 g/10 min to 2.5 g/10 min, 0.1 g/10 min to 2 g/10 min, 0.1 g/10 min to 1.5 g/10 min. In other embodiments, the LDPE has a melt index from 0.1 g/10 min to 1.1 g/10 min. In further embodiments, the LDPE has a melt index of 0.1-0.9 g/10 min.

The low density polyethylene may have a melt strength of from 10 cN to 35 cN. All individual values and subranges are included and disclosed herein. For example, in some embodiments, the low density polyethylene may have a melt strength of from 10 cN to 30 cN, from 10 cN to 28 cN, from 10 cN to 25 cN, from 10 cN to 20 cN, or from 10 cN to 18 cN. In other embodiments, the low density polyethylene may have a melt strength of from 12 cN to 30 cN, from 15 cN to 30 cN, from 18 cN to 30 cN, from 20 cN to 30 cN, or from 22 cN to 30 cN. In further embodiments, the low density polyethylene may have a melt strength of from 12 cN to 28 cN, from 12 cN to 25 cN, from 15 cN to 25 cN, from 15 cN to 23 cN, or from 17 cN to 23 cN.

The low density polyethylene may have a molecular weight distribution (MWD or Mw/Mn) of from 5 to 20. All individual values and subranges are included and disclosed herein. For example, in some embodiments, the low density polyethylene may have a MWD of from 5 to 18, from 5 to 15, from 5 to 12, from 5 to 10, or from 5 to 8. In other embodiments, the low density polyethylene may have a MWD of from 8 to 20, from 10 to 20, from 12 to 20, from 15 to 20, or from 17 to 20. In further embodiments, the low density polyethylene may have a MWD of from 8 to 18, from 8 to 15, from 10 to 18, or from 10 to 15. The MWD may be measured according to the triple detector gel permeation chromatography (TDGPC) test method outlined below.

The LDPE may include branched polymers that are partly or entirely homopolymerized or copolymerized in autoclave and/or tubular reactors, or any combination thereof, using any type of reactor or reactor configuration known in the art, at pressures above 14,500 psi (100 MPa) with the use of free-radical initiators, such as peroxides (see for example U.S. Pat. No. 4,599,392, herein incorporated by reference). In some embodiments, the LDPE may be made in an autoclave process under single phase conditions designed to impart high levels of long chain branching, such as described in PCT patent publication WO 2005/023912, the disclosure of which is incorporated herein. Examples of suitable LDPEs may include, but are not limited to, ethylene homopolymers, and high pressure copolymers, including ethylene interpolymerized with, for example, vinyl acetate, ethyl acrylate, butyl acrylate, acrylic acid, methacrylic acid, carbon monoxide, or combinations thereof. The ethylene may also be interpolymerized with an alpha-olefin comonomer, for example, at least one C3-C20 alpha-olefin, such as propylene, isobutylene, 1-butene, 1-pentene, 1-hexene, and mixtures thereof. Exemplary LDPE resins may include, but are not limited to, resins sold by The Dow Chemical Company, such as, LDPE 1321 resins, LDPE 6211 resins, LDPE 6621 resins, or AGILITY™ 1000 and 2001 resins, resins sold by Westlake Chemical Corporation (Houston, Tex.), such as EF412, EF602, EF403, or EF601, resins sold by LyondellBasell Industries (Houston, Tex.), such as, PETROTHENE™ M2520 or NA940, and resins sold by The ExxonMobil Chemical Company (Houston, Tex.) such as, LDPE LD 051.LQ or NEXXSTAR™ LDPE-00328. Other exemplary LDPE resins are described in WO 2014/051682 and WO 2011/019563, which are herein incorporated by reference.

Linear Low Density Polyethylene (LLDPE)

In some embodiments, the linear low density polyethylene has a polymer backbone that may lack measurable or demonstrable long chain branches. As used herein, "long chain branching" means branches having a chain length greater than that of any short chain branches, which are a result of comonomer incorporation. The long chain branch can be about the same length or as long as the length of the polymer backbone. In other embodiments, the linear low density polyethylene may have measurable or demonstrable long chain branches. For example, in some embodiments, the linear low density polyethylene is substituted with an average of from 0.001 long chain branches/10,000 carbons to 3 long chain branches/10,000 carbons, from 0.001 long chain branches/10,000 carbons to 1 long chain branches/10,000 carbons, from 0.05 long chain branches/10,000 carbons to 1 long chain branches/10,000 carbons. In other embodiments, the linear low density polyethylene is substituted with an average of less than 1 long chain branches/10,000 carbons, less than 0.5 long chain branches/10,000 carbons, or less than 0.05 long chain branches/10,000 carbons, or less than 0.01 long chain branches/10,000 carbons. Long chain branching (LCB) can be determined by conventional techniques known in the industry, such as 13C nuclear magnetic resonance (13C NMR) spectroscopy, and can be quantified using, for example, the method of Randall (Rev. Macromol. Chem. Phys., C29 (2 & 3), p. 285-297). Two other methods that may be used include gel permeation chromatography coupled with a low angle laser light scattering detector (GPC-LALLS), and gel permeation chromatography coupled with a differential viscometer detector (GPC-DV). The use of these techniques for long chain branch detection, and the underlying theories, have been well documented in the literature. See, for example, Zimm, B. H. and Stockmayer, W. H., J. Chem. Phys., 17, 1301 (1949) and Rudin A., Modern Methods of Polymer Characterization, John Wiley & Sons, New York (1991), pp. 103-112.

In some embodiments, the linear low density polyethylene may be a homogeneously branched or heterogeneously branched and/or unimodal or multimodal (e.g., bimodal) polyethylene. As used herein, "unimodal" refers to the MWD in a GPC curve does not substantially exhibit multiple component polymers (i.e., no humps, shoulders or tails exist or are substantially discernible in the GPC curve). In other words, the degree of separation is zero or substantially close to zero. As used herein, "multimodal" refers to the MWD in a GPC curve exhibits two or more component polymers, wherein one component polymer may even exist as a hump, shoulder or tail relative to the MWD of the other component polymer. The linear low density polyethylene comprises ethylene homopolymers, interpolymers of ethylene and at least one comonomer, and blends thereof. Examples of suitable comonomers may include alpha-olefins. Suitable alpha-olefins may include those containing from 3 to 20 carbon atoms (C3-C20). For example, the alpha-olefin may be a C4-C20 alpha-olefin, a C4-C12 alpha-olefin, a C3-C10 alpha-olefin, a C3-C8 alpha-olefin, a C4-C8 alpha-olefin, or a C6-C8 alpha-olefin. In some embodiments, the linear low density polyethylene is an ethylene/alpha-olefin copolymer, wherein the alpha-olefin is selected from the group consisting of propylene, 1-butene, 1-pentene, 1-hexene, 4-methyl-1-pentene, 1-heptene, 1-octene, 1-nonene and 1-decene. In other embodiments, the linear low density polyethylene is an ethylene/alpha-olefin copolymer, wherein the alpha-olefin is selected from the group consisting of propylene, 1-butene, 1-hexene, and 1-octene. In further embodiments, the linear low density polyethylene is an ethylene/alpha-olefin copolymer, wherein the alpha-olefin is selected from the group consisting of 1-hexene and 1-octene. In even further embodiments, the linear low density polyethylene is an ethylene/alpha-olefin copolymer, wherein the alpha-olefin is 1-octene. In even further embodiments, the linear low density polyethylene is a substantially linear ethylene/alpha-olefin copolymer, wherein the alpha-olefin is 1-octene. In some embodiments, the linear low density polyethylene is an ethylene/alpha-olefin copolymer, wherein the alpha-olefin is 1-butene.

In some embodiments, the linear low density polyethylene is an ethylene/alpha-olefin copolymer that may comprise greater than 50%, by weight, of the units derived from ethylene. All individual values and subranges of greater than 50%, by weight, are included and disclosed herein. For example, the linear low density polyethylene is an ethylene/alpha-olefin copolymer that may comprise at least 60%, at least 70%, at least 80%, at least 90%, at least 92%, at least 95%, at least 97%, at least 98%, at least 99%, at least 99.5%, from greater than 50% to 99%, from greater than 50% to 97%, from greater than 50% to 94%, from greater than 50% to 90%, from 70% to 99.5%, from 70% to 99%, from 70% to 97% from 70% to 94%, from 80% to 99.5%, from 80% to 99%, from 80% to 97%, from 80% to 94%, from 80% to 90%, from 85% to 99.5%, from 85% to 99%, from 85% to 97%, from 88% to 99.9%, 88% to 99.7%, from 88% to 99.5%, from 88% to 99%, from 88% to 98%, from 88% to 97%, from 88% to 95%, from 88% to 94%, from 90% to 99.9%, from 90% to 99.5% from 90% to 99%, from 90% to 97%, from 90% to 95%, from 93% to 99.9%, from 93% to 99.5% from 93% to 99%, or from 93% to 97%, by weight, of the units derived from ethylene. The linear low density polyethylene is an ethylene/alpha-olefin copolymer that may comprise less than 30%, by weight, of units derived from one or more alpha-olefin comonomers. All individual values and subranges of less than 30%, by weight, are included herein and disclosed herein. For example, the linear low density polyethylene is an ethylene/alpha-olefin copolymer that may comprise less than 25%, less than 20%, less than 18%, less than 15%, less than 12%, less than 10%, less than 8%, less than 5%, less than 4%, less than 3%, from 0.2 to 15%, 0.2 to 12%, 0.2 to 10%, 0.2 to 8%, 0.2 to 5%, 0.2 to 3%, 0.2 to 2%, 0.5 to 12%, 0.5 to 10%, 0.5 to 8%, 0.5 to 5%, 0.5 to 3%, 0.5 to 2.5%, 1 to 10%, 1 to 8%, 1 to 5%, 1 to 3%, 2 to 10%, 2 to 8%, 2 to 5%, 3.5 to 12%, 3.5 to 10%, 3.5 to 8%, 3.5% to 7%, or 4 to 12%, 4 to 10%, 4 to 8%, or 4 to 7%, by weight, of units derived from one or more alpha-olefin comonomers. The comonomer content may be measured using any suitable technique, such as techniques based on nuclear magnetic resonance ("NMR") spectroscopy, and, for example, by 13C NMR analysis as described in U.S. Pat. No. 7,498,282, which is incorporated herein by reference.

In some embodiments, the linear low density polyethylene is an ethylene/alpha-olefin copolymer that may comprise at least 90 percent by moles of units derived from ethylene. All individual values and subranges from at least 90 mole percent are included herein and disclosed herein; for example, the linear low density polyethylene is an ethylene/alpha-olefin copolymer that may comprise at least 93 percent, at least 95 percent, at least 96 percent, at least 97 percent, at least 98 percent, at least 99 percent, by moles, of units derived from ethylene; or in the alternative, the linear low density polyethylene is an ethylene/alpha-olefin copolymer that may comprise from 85 to 99.5 percent, from 85 to 99 percent, from 85 to 97 percent, from 85 to 95 percent, from 88 to 99.5 percent, from 88 to 99 percent, from 88 to 97 percent, from 88 to 95 percent, from 90 to 99.5 percent, from 90 to 99 percent, from 90 to 97 percent, from 90 to 95 percent, from 92 to 99.5, from 92 to 99 percent, from 92 to 97 percent, from 95 to 99.5 percent, from 95 to 99 percent, from 97 to 99.5 percent, or from 97 to 99 percent, by moles, of units derived from ethylene. The linear low density polyethylene is an ethylene/alpha-olefin copolymer that may comprise less than 15 percent by moles of units derived from one or more α-olefin comonomers. All individual values and subranges from less than 15 mole percent are included herein and disclosed herein. For example, the linear low density polyethylene is an ethylene/alpha-olefin copolymer that may comprise less than 12 percent, less than 10 percent, less than 8 percent, less than 7 percent, less than 5 percent, less than 4 percent, or less than 3 percent, by moles, of units derived from one or more alpha-olefin comonomers; or in the alternative, the linear low density polyethylene is an ethylene/alpha-olefin copolymer that may comprise from 0.5 to 15 percent, from 0.5 to 12 percent, from 0.5 to 10 percent, 0.5 to 8 percent, 0.5 to 5 percent, 0.5 to 3 percent, 1 to 12 percent, 1 to 10 percent, 1 to 8 percent, 1 to 5 percent, 2 to 12 percent, 2 to 10 percent, 2 to 8 percent, 2 to 5 percent, 3 to 12 percent, 3 to 10 percent, 3 to 7 percent, by moles of units derived from one or more alpha-olefin comonomers. The comonomer content may be measured using any suitable technique, such as techniques based on nuclear magnetic resonance ("NMR") spectroscopy, and, for example, by 13C NMR analysis as described in U.S. Pat. No. 7,498,282, which is incorporated herein by reference.

Other examples of suitable linear low density polyethylene include substantially linear ethylene polymers, which are further defined in U.S. Pat. Nos. 5,272,236, 5,278,272, 5,582,923, 5,733,155, and EP2653392, and which are incorporated by reference; homogeneously branched linear ethylene polymer compositions, such as those in U.S. Pat. No. 3,645,992, which is incorporated by reference; heterogeneously branched ethylene polymers, such as those prepared according to the process disclosed in U.S. Pat. No. 4,076,698; and/or blends thereof (such as those disclosed in U.S. Pat. No. 3,914,342 or 5,854,045), all of which is incorporated by reference. In some embodiments, the linear low density polyethylene may include ELITE™, ELITE™ AT, ATTANE™, AFFINITY™, FLEXOMER™, or DOWLEX™ resins sold by The Dow Chemical Company, including, for example, ELITE™ 5100G or 5400G resins, ELITE™ AT 6401, ATTANE™ 4201 or 4202 resins, AFFINITY™ 1840, and DOWLEX™ 2020, 2045G, 2049B, or 2685 resins; EXCEED™ or ENABLE™ resins sold by Exxon Mobil Corporation, including, for example, EXCEED™ 1012, 1018 or 1023JA resins, and ENABLE™ 27-03, 27-05, or 35-05 resins; linear low density polyethylene resins sold by Westlake Chemical Corporation, including, for example, LLDPE LF1020 or HIFOR Xtreme™ SC74836 resins; linear low density polyethylene resins sold by LyondellBasell Industries, including, for example, PETROTHENE™ GA501 and LP540200 resins, and ALATHON™ L5005 resin; linear low density polyethylene resins sold by Nova Chemicals Corp., including, for example, SCLAIR™ FP120 and NOVAPOL™ TF-Y534; linear low density polyethylene resins sold by Chevron Phillips Chemical Company, LLC, including, for example, mPACT™ D139 or D350 resins and MARFLEX™ HHM TR-130 resin; linear low density polyethylene resins sold by *Borealis* AG, including, for example, BORSTAR™ FB 2310 resin.

The linear low density polyethylene can be made via gas-phase, solution-phase, or slurry polymerization processes, or any combination thereof, using any type of reactor or reactor configuration known in the art, e.g., fluidized bed gas phase reactors, loop reactors, stirred tank reactors, batch reactors in parallel, series, and/or any combinations thereof. In some embodiments, gas or slurry phase reactors are used. Suitable linear low density polyethylene may be produced according to the processes described at pages 15-17 and 20-22 in WO 2005/111291 A1, which is herein incorporated by reference. The catalysts used to make the linear low density polyethylene described herein may include Ziegler-Natta, chrome, metallocene, constrained geometry, or single site catalysts. In some embodiments, the LLDPE may be a znLLDPE, which refers to linear polyethylene made using Ziegler-Natta catalysts, a uLLDPE or "ultra linear low density polyethylene," which may include linear polyethylenes made using Ziegler-Natta catalysts, or a mLLDPE, which refers to LLDPE made using metallocene or constrained geometry catalyzed polyethylene. In some embodiments, unimodal LLDPE may be prepared using a single stage polymerization, e.g. slurry, solution, or gas phase polymerization. In some embodiments, the unimodal LLDPE may be prepared via solution polymerization. In other embodiments, the unimodal LLDPE may be prepared via slurry polymerization in a slurry tank. In another embodiment, the unimodal LLDPE may be prepared in a loop reactor, for example, in a single stage loop polymerization process. Loop reactor processes are further described in WO/2006/045501 or WO2008104371. Multimodal (e.g. bimodal) polymers can be made by mechanical blending of two or more separately prepared polymer components or prepared in-situ in a multistage polymerization process. Both mechanical blending and preparation in-situ. In some embodiments, a multimodal LLDPE may be prepared in-situ in a multistage, i.e. two or more stage, polymerization or by the use of one or more different polymerization catalysts, including single-, multi- or dual site catalysts, in a one stage polymerization. For example, the multimodal LLDPE is produced in at least two-stage polymerization using the same catalyst, for e.g. a single site or Ziegler-Natta catalyst, as disclosed in U.S. Pat. No. 8,372,931, which is herein incorporated by reference. Thus, for example two solution reactors, two slurry reactors, two gas phase reactors, or any combinations thereof, in any order can be employed, such as disclosed in U.S. Pat. No. 4,352,915 (two slurry reactors), U.S. Pat. No. 5,925,448 (two fluidized bed reactors), and U.S. Pat. No. 6,445,642 (loop reactor followed by a gas phase reactor). However, in other embodiments, the multimodal polymer, e.g. LLDPE, may be made using a slurry polymerization in a loop reactor followed by a gas phase polymerization in a gas phase reactor, as disclosed in EP 2653392 A1, which is herein incorporated by reference.

In embodiments herein, the linear low density polyethylene has a density of 0.910 to 0.940 g/cc. All individual values and subranges from 0.910 to 0.940 g/cc are included and disclosed herein. For example, in some embodiments, the linear low density polyethylene has a density of 0.910 to 0.935 g/cc, 0.910 to 0.930 g/cc, 0.910 to 0.927 g/cc, 0.910 to 0.925 g/cc, or 0.910 to 0.920 g/cc. In other embodiments, the linear low density polyethylene has a density of 0.915 to 0.940 g/cc, 0.915 to 0.935 g/cc, 0.915 to 0.930 g/cc, 0.915 to 0.927 g/cc, or 0.915 to 0.925 g/cc. In further embodiments, the linear low density polyethylene has a density of 0.930 to 0.940 g/cc, 0.932 to 0.940 g/cc, or 0.932 to 0.938 g/cc. Densities disclosed herein are determined according to ASTM D-792.

In embodiments herein, the linear low density polyethylene has a melt index, or I2, of 0.5 g/10 min to 10 g/10 min. All individual values and subranges from 0.5 g/10 min to 10 g/10 min are included and disclosed herein. For example, in some embodiments, the linear low density polyethylene has a melt index of 0.5 g/10 min to 8 g/10 min, 0.5 g/10 min to 5 g/10 min, 0.5 g/10 min to 3 g/10 min, 0.5 g/10 min to 2 g/10 min, 0.5 g/10 min to 1.5 g/10 min, or 0.5 g/10 min to 1.2 g/10 min. In other embodiments, the linear low density polyethylene has a melt index of 0.75 g/10 min to 10 g/10 min, 0.9 g/10 min to 10 g/10 min, 1.0 g/10 min to 10 g/10 min, 0.75 g/10 min to 5 g/10 min, 0.9 g/10 min to 5 g/10 min, 1.0 g/10 min to 5 g/10 min, 0.75 g/10 min to 3 g/10 min, 0.9 g/10 min to 3 g/10 min, 1.0 g/10 min to 3 g/10 min, 0.75 g/10 min to 2 g/10 min, 0.9 g/10 min to 2 g/10 min, or 1.0 g/10 min to 2 g/10 min. Melt index, or I2, is determined according to ASTM D1238 at 190° C., 2.16 kg.

In some embodiments, the linear low density polyethylene may have a melt index ratio, I10/I2, of from 6 to 20. All individual values and subranges are included and disclosed herein. For example, the linear low density polyethylene may have a melt index ratio, I10/I2, of from 7 to 20, from 9 to 20, from 10 to 20, from 12 to 20, or from 15 to 20. In other embodiments, the linear low density polyethylene may have a melt index ratio, I10/I2, of less than 20, less than 15, less than 12, less than 10, or less than 8. In further embodiments, the linear low density polyethylene may have a melt index ratio, I10/I2, of from 6 to 18, from 6 to 16, from 6 to 15, from 6 to 12, or from 6 to 10. In even further embodiments, the linear low density polyethylene may have a melt index ratio, I10/I2, of from 7 to 18, from 7 to 16, from 8 to 15, from 8 to 14, or from 10 to 14. I10 may be determined according to ASTM D1238 at 190° C., 10.0 kg.

In some embodiments, the linear low density polyethylene may have a melt index ratio, I21/I2, of from 20 to 80. All individual values and subranges are included and disclosed herein. For example, the linear low density polyethylene may have a melt index ratio, I21/I2, of from 20 to 75, 20 to 70, 20 to 65, 20 to 60, 20 to 55, 20 to 50, 25 to 75, 25 to 70, 25 to 65, 25 to 60, 25 to 55, 25 to 50, 30 to 80, 30 to 75, 30 to 70, 30 to 65, 30 to, 60, 30 to 55, 30 to 50, 35 to 80, 35 to 75, 35 to 70, 35 to 65, 35 to 60, or 35 to 55 g/10 min. In other embodiments, the linear low density polyethylene may have a melt index ratio, I21/I2, of less than 50, less than 47, less than 45, less than 42, less than 40, less than 35, less than 30. In further embodiments, the linear low density polyethylene may have a melt index ratio, I21/I2, of 20 to 40, 20 to 37, 22 to 37, 22 to 35, 25 to 35, or 25 to 30.

In some embodiments, the linear low density polyethylene may have an Mw/Mn ratio of less than 10.0. All individual values and subranges are included and disclosed herein. For example, the linear low density polyethylene may have an Mw/Mn ratio of less than 9.0, less than 7.0, less than 6.0, less than 5.5, less than 5.0, less than 4.5, less than 4.0, or less than 3.8. In other embodiments, the linear low density polyethylene may have an Mw/Mn ratio of from 2.0 to 10.0, from 2.0 to 8.0, from 2.0 to 6.0, 2.0 to 5.5, 2.0 to 5.0, 2.0 to 4.5, 2.0 to 4.0, 2.2 to 6.0, 2.2 to 5.5, 2.2 to 5.0, 2.2 to 4.5, 2.2 to 4.0, 2.5 to 6.0, 2.5 to 5.5, 2.5 to 5.0, 2.5 to 4.5, or 2.5 to 4.0. In further embodiments, the linear low density polyethylene may have an Mw/Mn ratio of from 3.0 to 5.5, 3.0 to 4.5, 3.0 to 4.0, 3.2 to 5.5, 3.2 to 5, or 3.2 to 4.5. The Mw/Mn ratio may be determined by conventional gel permeation chromatography (GPC) as outlined below.

In some embodiments, the linear low density polyethylene may have an Mz/Mw ratio of 1.5 to 6.0. All individual values and subranges are included and disclosed herein. The linear low density polyethylene can range from a lower limit of 1.5, 1.75, 2.0, 2.5, 2.75, 3.0, or 3.5 to an upper limit of 1.65, 1.85, 2.0, 2.55, 2.90, 3.34, 3.79, 4.0, 4.3, 4.5, 5.0, 5.25, 5.5, 5.8, 6.0. For example, in some embodiments, the linear low density polyethylene may have an Mz/Mw ratio of 1.5 to 5.5, 1.5 to 5.0, 1.5 to 4.0, 1.5 to 3.5, 1.5 to 3.0, or from 1.5 to 2.5.

Ethylene/Alpha-Olefin Interpolymer

The ethylene/α-olefin interpolymer composition comprises (a) less than or equal to 100 percent, for example, at least 70 percent, at least 75 percent, at least 80 percent, at least 85 percent, at least 90 percent, or at least 92 percent, by weight of the units derived from ethylene; and (b) less than 30 percent, for example, less than 25 percent, less than 20 percent, less than 15 percent, less than 10 percent, or less than 8 percent, by weight of units derived from one or more α-olefin comonomers. The term "ethylene/α-olefin interpolymer composition" refers to a polymer that contains more than 50 mole percent polymerized ethylene monomer (based on the total amount of polymerizable monomers) and, optionally, may contain at least one comonomer. The comonomer content may be measured using any suitable technique, such as techniques based on nuclear magnetic resonance ("NMR") spectroscopy, and, for example, by 13C NMR analysis as described in U.S. Pat. No. 7,498,282, which is incorporated herein by reference The α-olefin comonomers have no more than 20 carbon atoms. For example, the α-olefin comonomers may have 3 to 10 carbon atoms, or 3 to 8 carbon atoms. Exemplary α-olefin comonomers include, but are not limited to, propylene, 1-butene, 1-pentene, 1-hexene, 1-heptene, 1-octene, 1-nonene, 1-decene, and 4-methyl-1-pentene. The one or more α-olefin comonomers may, for example, be selected from the group consisting of propylene, 1-butene, 1-hexene, and 1-octene; or in the alternative, from the group consisting of 1-hexene and 1-octene.

In embodiments herein, the ethylene/α-olefin interpolymer composition has a density in the range of 0.865 to 0.910 g/cc. All individual values and subranges from 0.865 to 0.910 g/cc are included and disclosed herein. For example, in some embodiments, the ethylene/α-olefin interpolymer composition has a density from a lower limit of 0.870, 0.875, 0.880, 0.890, or 0.895 g/cc to an upper limit of 0.910, 0.908, or 0.905 g/cc.

In embodiments herein, the ethylene/α-olefin interpolymer composition has a melt index ($I_2$) in a range of from 0.1 to 5 g/10 minutes. All individual values and subranges from 0.1 to 5 g/10 minutes are included and disclosed herein. For example, in some embodiments, the ethylene/α-olefin interpolymer composition has a melt index ($I_2$) ranging from a lower limit of 0.1, 0.2, 0.5, or 0.8 g/10 minutes to an upper limit of 1.2, 1.5, 1.8, 2.0, 2.2, 2.5, 3.0, 4.0, 4.5 or 5.0 g/10 minutes.

In embodiments herein, the ethylene/α-olefin interpolymer composition may have a melt index ratio, I10/I2, of from 6 to 12. All individual values and subranges are included and disclosed herein. For example, the ethylene/α-olefin interpolymer composition may have a melt index ratio, I10/I2, of from 6 to 11, from 6.5 to 11, from 7 to 11, from 7 to 10, or from 7.5 to 10.

In embodiments herein, the ethylene/α-olefin interpolymer composition has a molecular weight distribution ($M_w/M_n$) in the range of from 1.8 to 3.5. All individual values and subranges from 1.8 to 3.5 are included and disclosed herein. For example, in some embodiments, the ethylene/α-olefin interpolymer composition has a molecular weight distribution ($M_w/M_n$) ranging from a lower limit of 1.8, 2, 2.1, or 2.2 to an upper limit of 2.5, 2.7, 2.9, 3.2, or 3.5.

In embodiments herein, the ethylene/α-olefin interpolymer composition has a Comonomer Distribution Constant (CDC) in the range of from 95 to 200. All individual values and subranges from 95 to 200 are included and disclosed herein. For example, in some embodiments, the ethylene/α-olefin interpolymer composition has a CDC from 95 to 175, from 95 to 150, or from 95 to 125.

In embodiments herein, the ethylene/α-olefin interpolymer composition may have a molecular weight (Mw) in the range of 50,000 to 250,000 g/mole. For example, the molecular weight (Mw) can be from a lower limit of 50,000, 60,000, 70,000 g/mole to an upper limit of 150,000, 180,000, 200,000 or 250,000 g/mole.

In embodiments herein, the ethylene/α-olefin interpolymer composition may have a molecular weight distribution (Mz/Mw) in the range of less than 4, less than 3.75, less than 3.5, less than 3.25, less than 3, or from 1.8 to 3.8, from 1.8 to 3.5, from 1.8 to 3.3, from 1.8 to 3.0, from 2.0 to 3.0, or from 2.0 to 2.8.

In embodiments herein, the ethylene/α-olefin interpolymer composition may have a vinyl unsaturation of less than 0.15 vinyls per one thousand carbon atoms present in the backbone of the ethylene/α-olefin interpolymer composition. In embodiments herein, the ethylene/α-olefin interpolymer composition may have a zero shear viscosity ratio (ZSVR) in the range of from 2 to 20, for example, from 2 to 10, from 2 to 6, or from 2.5 to 4. In embodiments herein, the ethylene/α-olefin interpolymer composition may have a vinyl unsaturation of less than 0.15 vinyls per one thousand carbon atoms present in the backbone of the ethylene/α-olefin interpolymer composition; and a zero shear viscosity ratio (ZSVR) in the range from 2 to 20, or alternatively, from 2 to 10, from 2 to 6, or from 2.5 to 4. The ethylene/α-olefin interpolymer composition may have a long chain branching frequency in the range of from 0.02 to 3 long chain branches (LCB) per 1000 carbon atoms.

In embodiments herein, the ethylene/α-olefin interpolymer composition may have a vicat softening point (° C.) of less than 98° C. All individual values and subranges less than 98° C. are included and disclosed herein. For example, in some embodiments, the ethylene/α-olefin interpolymer composition may have a vicat softening point (° C.) of less than 97° C., less than 96° C., or less than 95.5° C. In other embodiments, the ethylene/α-olefin interpolymer composition may have a vicat softening point (° C.) ranging from 70° C. to less than 98° C., from 70° C. to 97° C., or from 70° C. to 96° C.

In embodiments herein, the ethylene/α-olefin interpolymer composition may have a peak melting point temperature (° C.) of less than 123° C. All individual values and subranges less than 123° C. are included and disclosed herein. For example, in some embodiments, the ethylene/α-olefin interpolymer composition may have a peak melting point temperature (° C.) of less than 120° C., less than 115° C., less than 110° C., or less than 105° C. In other embodiments, the ethylene/α-olefin interpolymer composition may have a peak melting point temperature (° C.) ranging from 90° C. to less than 120° C., from 90° C. to 115° C., or from 90° C. to 110° C.

In one embodiment, ethylene/α-olefin interpolymer composition has a comonomer distribution profile comprising a monomodal distribution or a bimodal distribution in the temperature range of from 35° C. to 120° C., excluding purge.

Any conventional ethylene (co)polymerization reaction processes may be employed to produce the ethylene/α-olefin interpolymer composition. Such conventional ethylene (co)polymerization reaction processes include, but are not limited to, gas phase polymerization process, slurry phase polymerization process, solution phase polymerization process, and combinations thereof using one or more conventional reactors, e.g. fluidized bed gas phase reactors, loop reactors, stirred tank reactors, batch reactors in parallel, series, and/or any combinations thereof. Examples of suitable polymerization processes are described in U.S. Pat. Nos. 6,982,311, 6,486,284, 8,829,115 or U.S. Pat. No. 8,327,931, which are incorporated herein by reference.

Multilayer Shrink Films

The first layer, second layer, and/or third layer of the multilayer shrink films described herein may further incorporate optional polymers and additives. Exemplary optional polymers may include a medium density polyethylene (MDPE), a high density polyethylene (HDPE), or combinations thereof. In some embodiments, the first layer, second layer, and/or third layer of the multilayer shrink film may comprise from 0.5 to 30%, by weight of the polymer composition, of MDPE. All individual values and subranges from 0.5 to 30% are included and disclosed herein. For example, in some embodiments, the first layer, second layer, and/or third layer of the multilayer shrink film may comprise from 1 to 30%, 1 to 20%, 1 to 15%, 1 to 10%, by weight of the polymer composition, of MDPE. In further embodiments, the first layer, second layer, and/or third layer of the multilayer shrink film may further comprise from 5 to 10%, by weight of the polymer composition, of MDPE.

In some embodiments, the first layer, second layer, and/or third layer of the multilayer shrink film may comprise from 0.5 to 30%, by weight of the polymer composition, of HDPE. All individual values and subranges from 0.5 to 30% are included and disclosed herein. For example, in some embodiments, the first layer, second layer, and/or third layer of the multilayer shrink film may comprise from 1 to 30%, 1 to 20%, 1 to 15%, 1 to 10%, by weight of the polymer composition, of HDPE. In further embodiments, the first layer, second layer, and/or third layer of the multilayer shrink film may further comprise from 5 to 10%, by weight of the polymer composition, of HDPE.

The MDPE may be an ethylene homopolymer or copolymers of ethylene and alpha-olefins. Suitable alpha-olefins may include those containing from 3 to 20 carbon atoms (C3-C20). For example, the alpha-olefin may be a C4-C20 alpha-olefin, a C4-C12 alpha-olefin, a C3-C10 alpha-olefin, a C3-C8 alpha-olefin, a C4-C8 alpha-olefin, or a C6-C8 alpha-olefin. In some embodiments, the MDPE is an ethylene/alpha-olefin copolymer, wherein the alpha-olefin is selected from the group consisting of propylene, 1-butene, 1-pentene, 1-hexene, 4-methyl-1-pentene, 1-heptene, 1-octene, 1-nonene and 1-decene. In other embodiments, the MDPE is an ethylene/alpha-olefin copolymer, wherein the alpha-olefin is selected from the group consisting of propylene, 1-butene, 1-hexene, and 1-octene.

The MDPE may have a density of from 0.923 g/cc and 0.935 g/cc. All individual values and subranges are included and disclosed herein. For example, in some embodiments, the MDPE may have a density of from 0.923 g/cc to 0.934 g/cc, 0.923 g/cc to 0.932 g/cc, or 0.923 g/cc to 0.930 g/cc. In other embodiments, the MDPE may have a density of from 0.925 g/cc to 0.935 g/cc, 0.928 g/cc to 0.935 g/cc, or 0.929 g/cc to 0.935 g/cc. The MDPE may have a melt index, or I2, of from 0.05 g/10 min to 5 g/10 min. All individual values and subranges are included and disclosed herein. For example, in some embodiments, the MDPE may have a melt index from 0.05 g/10 min to 2.5 g/10 min, 0.05 g/10 min to 2 g/10 min, 0.05 g/10 min to 1.5 g/10 min. In other embodiments, the MDPE has a melt index from 0.05 g/10 min to 1.1 g/10 min. In further embodiments, the MDPE has a melt index of 0.1-0.9 g/10 min.

In some embodiments, the MDPE may have a molecular weight distribution (MWD) of 2.0 to 8.0. All individual values and subranges are included and disclosed herein. For example, in some embodiments, the MDPE may have a MWD of 2.0 to 7.5, 2.0 to 7.0, 2.0 to 6.5, 2.0 to 6.0, 2.0 to 5.5, 2.0 to 5.0, 2.0 to 4.5, 2.0 to 4.0, 2.0 to 3.8, 2.0 to 3.6, 2.0 to 3.4, 2.0 to 3.2, or 2.0 to 3.0. In other embodiments, the MDPE may have a MWD of 2.2 to 4.0, 2.4 to 4.0, 2.6 to 4.0, 2.8 to 4.0, or 3.0 to 4.0. In further embodiments, the MDPE may have a MWD of 3.0 to 8.0, 3.5 to 8.0, 3.5 to 7.5, 3.5 to 7.0, 4.0 to 7.0, or 4.0 to 6.5.

The MDPE may be made by a gas-phase, solution-phase, or slurry polymerization processes, or any combination thereof, using any type of reactor or reactor configuration known in the art, e.g., fluidized bed gas phase reactors, loop reactors, stirred tank reactors, batch reactors in parallel, series, and/or any combinations thereof. In some embodiments, gas or slurry phase reactors are used. In some embodiments, the MDPE is made in the solution process operating in either parallel or series dual reactor mode. The MDPE may also be made by a high pressure, free-radical polymerization process. Methods for preparing MDPE by high pressure, free radical polymerization can be found in U.S. 2004/0054097, which is herein incorporated by reference, and can be carried out in an autoclave or tubular reactor as well as any combination thereof. The catalysts used to make the MDPE described herein may include Ziegler-Natta, metallocene, constrained geometry, single site catalysts, or chromium-based catalysts. Exemplary suitable MDPE resins may include resins sold by The Dow Chemical Company, such as, DOWLEX™ 2038.68G or DOWLEX™ 2042G, resins sold by LyondellBasell Industries (Houston, Tex.), such as, PETROTHENE™ L3035, ENABLE™ resins sold by The ExxonMobil Chemical Company (Houston, Tex.), resins sold by Chevron Phillips Chemical Company LP, such as, MARFLEX™ TR-130, and resins sold by Total Petrochemicals & Refining USA Inc., such as HF 513, HT 514, and HR 515. Other exemplary MDPE resins are described in U.S. 2014/0255674, which is herein incorporated by reference.

The HDPE may also be an ethylene homopolymer or copolymers of ethylene and alpha-olefins. Suitable alpha-olefins may include those containing from 3 to 20 carbon atoms (C3-C20). For example, the alpha-olefin may be a C4-C20 alpha-olefin, a C4-C12 alpha-olefin, a C3-C10 alpha-olefin, a C3-C8 alpha-olefin, a C4-C8 alpha-olefin, or a C6-C8 alpha-olefin. In some embodiments, the HDPE is an ethylene/alpha-olefin copolymer, wherein the alpha-olefin is selected from the group consisting of propylene, 1-butene, 1-pentene, 1-hexene, 4-methyl-1-pentene, 1-heptene, 1-octene, 1-nonene and 1-decene. In other embodiments, the HDPE is an ethylene/alpha-olefin copolymer, wherein the alpha-olefin is selected from the group consisting of propylene, 1-butene, 1-hexene, and 1-octene. The amount of comonomer used will depend upon the desired density of the HDPE polymer and the specific comonomers selected, taking into account processing conditions, such as temperature and pressure, and other factors such as the presence or absence of telomers and the like, as would be apparent to one of ordinary skill in the art in possession of the present disclosure.

The HDPE may have a density of from 0.935 g/cc and 0.975 g/cc. All individual values and subranges are included and disclosed herein. For example, in some embodiments, the HDPE may have a density of from 0.940 g/cc to 0.975 g/cc, 0.940 g/cc to 0.970 g/cc, or 0.940 g/cc to 0.965 g/cc. In other embodiments, the HDPE may have a density of from 0.945 g/cc to 0.975 g/cc, 0.945 g/cc to 0.970 g/cc, or 0.945 g/cc to 0.965 g/cc. In further embodiments, the HDPE may have a density of from 0.947 g/cc to 0.975 g/cc, 0.947 g/cc to 0.970 g/cc, 0.947 g/cc to 0.965 g/cc, 0.947 g/cc to 0.962 g/cc, or 0.950 g/cc to 0.962 g/cc. The HDPE may have a melt index, or I2, of from 0.01 g/10 min to 100 g/10 min. All individual values and subranges are included and disclosed herein. For example, in some embodiments, the HDPE may have a melt index from 0.01 g/10 min to 5 g/10 min, 0.01 g/10 min to 4 g/10 min, 0.01 g/10 min to 3.5 g/10 min, 0.01 g/10 min to 3 g/10 min, 0.01 g/10 min to 2.5 g/10 min, 0.01 g/10 min to 2 g/10 min, 0.01 g/10 min to 1.5 g/10 min, 0.01 g/10 min to 1.25 g/10 min, or 0.01 g/10 min to 1 g/10 min. In other embodiments, the HDPE has a melt index from 0.05 g/10 min to 5 g/10 min, 0.1 g/10 min to 5 g/10 min, 1.0 g/10 min to 10 g/10 min, 1.0 g/10 min to 8 g/10 min, 1.0 g/10 min to 7 g/10 min, or 1.0 g/10 min to 5 g/10 min. In further embodiments, the HDPE has a melt index of 0.3-1.0 g/10 min.

The HDPE may be made by a gas-phase, solution-phase, or slurry polymerization processes, or any combination thereof, using any type of reactor or reactor configuration known in the art, e.g., fluidized bed gas phase reactors, loop reactors, stirred tank reactors, batch reactors in parallel, series, and/or any combinations thereof. In some embodiments, gas or slurry phase reactors are used. In some embodiments, the HDPE is made in the solution process operating in either parallel or series dual reactor mode. The catalysts used to make the HDPE described herein may include Ziegler-Natta, metallocene, constrained geometry, single site catalysts, or chromium-based catalysts. The HDPE can be unimodal, bimodal, and multimodal. Exemplary HDPE resins that are commercially available include, for instance, ELITE™ 5940G, ELITE™ 5960G, HDPE 35454L, HDPE 82054, HDPE DGDA-2484 NT, DGDA-2485 NT, DGDA-5004 NT, DGDB-2480 NT resins available from The Dow Chemical Company (Midland, Mich.), L5885 and M6020 HDPE resins from Equistar Chemicals, LP, ALATHON™ L5005 from LyondellBasell Industries (Houston, Tex.), and MARFLEX™ HDPE HHM TR-130 from Chevron Phillips Chemical Company LP. Other exemplary HDPE resins are described in U.S. Pat. No. 7,812,094, which is herein incorporated by reference.

Exemplary additives may include, but are not limited to, antistatic agents, color enhancers, dyes, lubricants, fillers such as TiO2 or CaCO3, opacifiers, nucleators, processing aids, pigments, primary antioxidants, secondary antioxidants, processing aids, UV stabilizers, anti-blocks, slip agents, tackifiers, fire retardants, anti-microbial agents, odor reducer agents, antifungal agents, and combinations thereof. The ethylene/α-olefin interpolymer composition may contain from about 0.1 to about 10 percent by the combined weight of such additives, based on the weight of the ethylene/α-olefin interpolymer composition including such additives. In some embodiments, the multilayer films described herein further comprise one or more additives selected from the group consisting of antiblocking agents, processing aids, slip agents, colors or pigments, and fillers.

In some embodiments, the multilayer films described herein may exhibit at least one of the following properties: a MD shrinkage higher than 20% at 120° C., according to ASTM D2732; a MD shrinkage higher than 30% at 130° C., according to ASTM D2732; a MD shrinkage higher than 50% at 140° C., according to ASTM D2732; or a MD shrinkage higher than 60% at 150° C., according to ASTM D2732. In some embodiments, the multilayer films described herein may exhibit at least one of the following properties: a CD shrinkage higher than 10% at 130° C., according to ASTM D2732; a CD shrinkage higher than 20% at 140° C., according to ASTM D2732; or a CD shrinkage higher than 25% at 150° C., according to ASTM D2732. In some embodiments, the multilayer films described herein may exhibit at least one of the following properties: an Elastic Recovery @ 50% MD elongation of at least 50%, according to ASTM D-5459; or an Elastic Recovery @ 50% CD elongation of at least 55%, according to ASTM D-5459.

The multilayer films described herein can be made by a variety of techniques, such as, blown film techniques. Methods of making multilayer blown films are described in U.S. Pat. No. 6,521,338 (Maka), the entirety of which patent is incorporated herein by reference. For example, in some embodiments, a multilayer shrink film can be made by co-extruding a first polymer blend, second polymer blend, and third polymer blend in an extruder to form a tube having a first layer formed from the first polymer blend, second layer formed from the second polymer blend, and third layer formed from the third polymer blend; and cooling the tube to form a multilayer shrink film; wherein the first polymer blend comprises from 50 to 90 wt. % of a low density polyethylene having a density from 0.910 to 0.930 g/cc and an $I_2$ from 0.1 to 10 g/10 min, and from 10 wt. % to 50 wt. % linear low density polyethylene having a density from 0.910 to 0.940 g/cc and an $I_2$ from 0.5 to 10 g/10, based on the total polymer weight in the first polymer blend; the second polymer blend comprises from 0 to 60 wt. %, based on the total polymer weight in the second polymer blend, of a low density polyethylene having a density from 0.910 to 0.930 g/cc and an $I_2$ from 0.1 to 10 g/10, and from 40 to 100 wt. %, based on the total polymer weight in the second polymer blend, of an ethylene/α-olefin interpolymer composition having a density in the range of from 0.860 g/cc to 0.910 g/cc, a melt index ($I_2$) in a range of from 0.1 to 5 g/10 minutes, a molecular weight distribution ($M_w/M_n$) in the range of from 1.8 to 3.5, and a Comonomer Distribution Constant (CDC) in the range of from 95 to 200; and the third polymer blend comprises from 50 to 90 wt % of a low density polyethylene having a density from 0.910 to 0.930 g/cc and an $I_2$ from 0.1 to 10 g/10 min; and from 10 wt % to 50 wt % linear low density polyethylene having a density from 0.910 to 0.940 g/cc and an $I_2$ from 0.5 to 10 g/10, based on the total polymer weight in the third polymer blend; and wherein the second layer is positioned between the first layer and the third layer.

Test Methods

Unless otherwise stated, the following test methods are used.

Density

Density can be measured in accordance with ASTM D-792.

Melt Index

Melt index ($I_2$) can be measured in accordance with ASTM D-1238, Procedure B (condition 190° C./2.16 kg). Melt index ($I_{10}$) can be measured in accordance with ASTM D-1238, Procedure B (condition 190° C./10.0 kg).

Vicat Softening Point

Vicat softening point may be measured in accordance with ASTM D-1525.

Gel Permeation Chromatography (GPC)

The chromatographic system consisted of a PolymerChar GPC-IR (Valencia, Spain) high temperature GPC chromatograph equipped with an internal IR5 detector. The autosampler oven compartment was set at 160° Celsius and the column compartment was set at 150° Celsius. The columns used were 3 Agilent "Mixed B" 30 cm 10-micron linear mixed-bed columns and a 10-um pre-column. The chromatographic solvent used was 1,2,4 trichlorobenzene and contained 200 ppm of butylated hydroxytoluene (BHT). The solvent source was nitrogen sparged. The injection volume used was 200 microliters and the flow rate was 1.0 milliliters/minute.

Calibration of the GPC column set was performed with 21 narrow molecular weight distribution polystyrene standards with molecular weights ranging from 580 to 8,400,000 and were arranged in 6 "cocktail" mixtures with at least a decade of separation between individual molecular weights. The standards were purchased from Agilent Technologies. The polystyrene standards were prepared at 0.025 grams in 50 milliliters of solvent for molecular weights equal to or greater than 1,000,000, and 0.05 grams in 50 milliliters of solvent for molecular weights less than 1,000,000. The polystyrene standards were dissolved at 80 degrees Celsius with gentle agitation for 30 minutes. The polystyrene standard peak molecular weights were converted to polyethylene molecular weights using Equation 1 (as described in Williams and Ward, J. Polym. Sci., Polym. Let., 6, 621 (1968)):

$$M_{polyethylene} = A \times (M_{polystyrene})^B \quad (EQ1)$$

where M is the molecular weight, A has a value of 0.4315 and B is equal to 1.0.

A fifth order polynomial was used to fit the respective polyethylene-equivalent calibration points. A small adjustment to A (from approximately 0.415 to 0.44) was made to correct for column resolution and band-broadening effects such that NIST standard NBS 1475 is obtained at 52,000 Mw.

The total plate count of the GPC column set was performed with Eicosane (prepared at 0.04 g in 50 milliliters of TCB and dissolved for 20 minutes with gentle agitation.) The plate count (Equation 2) and symmetry (Equation 3) were measured on a 200 microliter injection according to the following equations:

$$\text{Plate Count} = 5.54 * \left( \frac{RV_{PeakMax}}{\text{Peak Width at } \frac{1}{2} \text{ height}} \right)^2 \quad (EQ2)$$

where RV is the retention volume in milliliters, the peak width is in milliliters, the peak max is the maximum height of the peak, and ½ height is ½ height of the peak maximum.

$$\text{Symmetry} = \frac{(\text{Rear Peak } RV_{one\ tenth\ height} - RV_{Peak\ max})}{(RV_{Peak\ max} - \text{Front Peak } RV_{one\ tenth\ height})} \quad (EQ3)$$

where RV is the retention volume in milliliters and the peak width is in milliliters, Peak max is the maximum position of the peak, one tenth height is 1/10 height of the peak maximum, rear peak refers to the peak tail at later retention volumes than the peak max, and front peak refers to the peak front at earlier retention volumes than the peak max. The plate count for the chromatographic system should be greater than 24,000 and symmetry should be between 0.98 and 1.22.

Samples were prepared in a semi-automatic manner with the PolymerChar "Instrument Control" Software, wherein the samples were weight-targeted at 2 mg/ml, and the solvent (contained 200 ppm BHT) was added to a pre-nitrogen-sparged septa-capped vial, via the PolymerChar high temperature autosampler. The samples were dissolved for 2 hours at 160° Celsius under "low speed" shaking.

The calculations of Mn, Mw, and Mz were based on GPC results using the internal IR5 detector (measurement channel) of the PolymerChar GPC-IR chromatograph according to Equations 4-6, using PolymerChar GPCOne™ software, the baseline-subtracted IR chromatogram at each equally-spaced data collection point (i), and the polyethylene equivalent molecular weight obtained from the narrow standard calibration curve for the point (i) from Equation 1.

$$M_n = \frac{\sum_i IR_i}{\sum_i (IR_i / M_{polyethylene_i})} \quad (EQ\ 4)$$

$$M_w = \frac{\sum_i (IR_i * M_{polyethylene_i})}{\sum_i IR_i} \quad (EQ\ 5)$$

$$M_z = \frac{\sum_i (IR_i * M_{polyethylene_i}^2)}{\sum_i (IR_i * M_{polyethylene_i})} \quad (EQ\ 6)$$

In order to monitor the deviations over time, a flowrate marker (decane) was introduced into each sample via a micropump controlled with the PolymerChar GPC-IR system. This flowrate marker was used to linearly correct the flowrate for each sample by alignment of the respective decane peak within the sample to that of the decane peak within the narrow standards calibration. Any changes in the time of the decane marker peak are then assumed to be related to a linear shift in both flowrate and chromatographic slope. To facilitate the highest accuracy of a RV measurement of the flow marker peak, a least-squares fitting routine is used to fit the peak of the flow marker concentration chromatogram to a quadratic equation. The first derivative of the quadratic equation is then used to solve for the true peak position. After calibrating the system based on a flow marker peak, the effective flowrate (as a measurement of the calibration slope) is calculated as Equation 7. Processing of the flow marker peak was done via the PolymerChar GPCOne™ Software.

$$Flowrate_{effective} = Flowrate_{nominal} \times \frac{FlowMarker_{Calibration}}{FlowMarker_{Observed}} \quad (EQ7)$$

Comonomer Distribution Constant (CDC) Method

Comonomer distribution constant (CDC) is calculated from comonomer distribution profile by CEF. CDC is defined as Comonomer Distribution Index divided by Comonomer Distribution Shape Factor multiplying by 100 as shown in the following equation:

$$CDC = \frac{\text{Comonomer Distribution Index}}{\text{Comonomer Distribution Shape Factor}} = \frac{\text{Comonomer Distribution Index}}{\text{Half Width}/Stdev} \times 100$$

wherein Comonomer distribution index stands for the total weight fraction of polymer chains with the comonomer content ranging from 0.5 of median comonomer content ($C_{median}$) and 1.5 of $C_{median}$ from 35.0 to 119.0° C. Comonomer Distribution Shape Factor is defined as a ratio of the half width of comonomer distribution profile divided by the standard deviation of comonomer distribution profile from the peak temperature ($T_p$).

CDC is calculated according to the following steps:

(A) Obtain a weight fraction at each temperature (T) ($w_T(T)$) from 35.0° C. to 119.0° C. with a temperature step increase of 0.200° C. from CEF according to the following Equation:

$$\int_{35.0}^{119.0} w_T(T)dT = 1$$

(B) Calculate the median temperature ($T_{median}$) at cumulative weight fraction of 0.500, according to the following Equation:

$$\int_{35.0}^{T_{median}} w_T(T)dT = 0.5$$

(C) Calculate the corresponding median comonomer content in mole % ($C_{median}$) at the median temperature ($T_{median}$) by using comonomer content calibration curve according to the following Equation:

$$\ln(1 - \text{comonomer content}) = -\frac{207.26}{273.12 + T} + 0.5533$$

$$R^2 = 0.997$$

(D) Construct a comonomer content calibration curve by using a series of reference materials with known amount of comonomer content, i.e., eleven reference materials with narrow comonomer distribution (mono-modal comonomer distribution in CEF from 35.0 to 119.0° C.) with weight average $M_w$ of 35,000 to 115,000 (measured via conventional GPC) at a comonomer content ranging from 0.0 mole % to 7.0 mole % are analyzed with CEF at the same experimental conditions specified in CEF experimental sections;

(E) Calculate comonomer content calibration by using the peak temperature ($T_p$) of each reference material and its comonomer content; The calibration is calculated from each reference material according to the following Equation:

$$\ln(1 - \text{comonomer content}) = -\frac{207.26}{273.12 + T} + 0.5533$$

$$R^2 = 0.997$$

wherein: $R^2$ is the correlation constant;

(F) Calculate Comonomer Distribution Index from the total weight fraction with a comonomer content ranging from $0.5*C_{median}$ to $1.5*C_{median}$, and if $T_{median}$ is higher than 98.0° C., Comonomer Distribution Index is defined as 0.95;

(G) Obtain Maximum peak height from CEF comonomer distribution profile by searching each data point for the highest peak from 35.0° C. to 119.0° C. (if the two peaks are identical, then the lower temperature peak is selected); half width is defined as the temperature difference between the front temperature and the rear temperature at the half of the maximum peak height, the front temperature at the half of the maximum peak is searched forward from 35.0° C., while the rear temperature at the half of the maximum peak is searched backward from 119.0° C., in the case of a well-defined bimodal distribution where the difference in the peak temperatures is equal to or greater than the 1.1 times of the sum of half width of each peak, the half width of the inventive ethylene-based polymer composition is calculated as the arithmetic average of the half width of each peak;

(H) Calculate the standard deviation of temperature (Stdev) according the following Equation:

$$Stdev = \sqrt{\sum_{35.0}^{119.0} (T - T_p)^2}$$

An example of a comonomer distribution profile is shown in FIG. 23 of EP 2571690, which is incorporated herein by reference.

Differential Scanning Calorimetry (DSC)

Differential Scanning calorimetry (DSC) is used to measure the melting and crystallization behavior of a polymer over a wide range of temperatures. For example, the TA Instruments Q1000 DSC, equipped with an RCS (refrigerated cooling system) and an autosampler is used to perform this analysis. During testing, a nitrogen purge gas flow of 50 ml/min is used. Each sample is melt pressed into a thin film at about 175° C.; the melted sample is then air-cooled to room temperature (approx. 25° C.). The film sample is formed by pressing a "0.1 to 0.2 gram" sample at 175° C. at 1,500 psi, and 30 seconds, to form a "0.1 to 0.2 mil thick" film. A 3-10 mg, 6 mm diameter specimen is extracted from the cooled polymer, weighed, placed in a light aluminum pan (ca 50 mg), and crimped shut. Analysis is then performed to determine its thermal properties. The thermal behavior of the sample is determined by ramping the sample temperature up and down to create a heat flow versus temperature profile. First, the sample is rapidly heated to 180° C., and held isothermal for five minutes, in order to remove its thermal history. Next, the sample is cooled to −40° C., at a 10° C./minute cooling rate, and held isothermal at −40° C. for five minutes. The sample is then heated to 150° C. (this is the "second heat" ramp) at a 10° C./minute heating rate. The cooling and second heating curves are recorded. The cool curve is analyzed by setting baseline endpoints from the beginning of crystallization to −20° C. The heat curve is analyzed by setting baseline endpoints from −20° C. to the end of melt. The values determined are peak melting temperature (Tm), peak crystallization temperature (Tc), heat of fusion (Hf) (in Joules per gram), and the calculated % crystallinity for polyethylene samples using: % Crystallinity=((Hf)/(292 J/g))×100. The heat of fusion (Hf) and the peak melting temperature are reported from the second heat curve. Peak crystallization temperature is determined from the cooling curve.

Melt Strength

Melt strength may be measured at 190° C. using a Goettfert Rheotens 71.97 (Goettfert Inc.; Rock Hill, S.C.), melt fed with a Goettfert Rheotester 2000 capillary rheometer equipped with a flat entrance angle (180 degrees) of length of 30 mm and diameter of 2.0 mm. The pellets (20-30 gram pellets) are fed into the barrel (length=300 mm, diameter=12 mm), compressed and allowed to melt for 10 minutes before being extruded at a constant piston speed of 0.265 mm/s, which corresponds to a wall shear rate of 38.2 $s^{-1}$ at the given die diameter. The extrudate passes through the wheels of the Rheotens located 100 mm below the die exit and is pulled by the wheels downward at an acceleration rate of 2.4 mm/s². The force (in cN) exerted on the wheels is recorded as a function of the velocity of the wheels (in mm/s). Melt strength is reported as the plateau force (cN) before the strand broke.

Tensile Properties

Tensile properties, including the secant modulus at 2%, elongation at break, load at break, and yield stress, are determined in the machine and cross directions according to ASTM D88:2 using Instron Universal Tester.

Haze

Haze is measured according to ASTM D1003-07. A Hazegard Plus (BYK-Gardner USA; Columbia, Md.) is used for testing.

Clarity

Clarity is measured according to ASTM D1746.

45° Gloss

45° Gloss is measured according to ASTM D2457-08.

Elmendorf Tear Resistance

Elmendorf tear resistance is measured according to ASTM D-1922.

Puncture Resistance

Puncture resistance is measured according to ASTM D-5748.

Elastic Recovery @ 50% Elongation

Elastic recovery is measured according to ASTM D-5459.

Shrink at 120° C., 130° C., 140° C., & 150° C.

Shrink at 120° C., 130° C., 140° C., and 150° C. is measured according to ASTM D-2732.

EXAMPLES

Films

TABLE 1

| | | Resins Used in Films | | | | | |
|---|---|---|---|---|---|---|---|
| | ELITE ™ AT 6101 | AFFINITY ™ PL 1888G | AFFINITY ™ PF 1140G | DOWLEX ™ 2050B | ATTANE ™ 4203G | Dow LDPE 132i | Dow LLDPE 1613.11 |
| Density (g/cc) | 0.905 | 0.904 | 0.896 | 0.950 | 0.905 | 0.921 | 0.923 |
| Melt Index, I2 (g/10 min) | 0.8 | 1.0 | 1.6 | 0.95 | 0.8 | 0.25 | 1.3 |
| I10/I2 | 8 | 9.5 | 9.7 | | 8.7 | | |
| Mw (g/mole) | 106430 | 91980 | 160840 | | 132180 | | |
| Mn (g/mole) | 38630 | 35720 | 63160 | | 26910 | | |
| Mw/Mn (MWD) | 2.755 | 2.575 | 2.546 | | 4.912 | | |
| Melting Point (° C.) | 101 | 98 | 96 | | 123 | | |
| Vicat Softening Point (° C.) | 95 | 85 | 77 | | 98 | | |
| Peak Melting Point Temp. (° C.) | 101 | 98 | 96 | | 123 | | |
| CDC | 107.4 | | | | 88.3 | | |

All resins are commercially available from The Dow Chemical Company (Midland, Mich.).

TABLE 2

| | Film Formulations | | |
|---|---|---|---|
| | Layers formulation | | |
| Samples | Outer (25%) | Core (50%) | Outer (25%) |
| Reference shrink film | 60% LDPE 132I + 40% LLDPE 1613.11 | 50% LDPE 132I + 25% Dowlex ™ 2050B + 25% LLDPE 1613.11 | 60% LDPE 132I + 40% LLDPE 1613.11 |
| Inventive film 1 | 60% LDPE 132I + 40% LLDPE 1613.11 | 50% LDPE 132I + 49% Elite ™ 6101 + 1% Process Aid | 60% LDPE 132I + 40% LLDPE 1613.11 |
| Inventive film 2 | 60% LDPE 132I + 40% LLDPE 1613.11 | 50% LDPE 132i + 49% Affinity PL1888 + 1% Process Aid | 60% LDPE 132I + 40% LLDPE 1613.11 |
| Inventive film 3 | 60% LDPE 132I + 40% LLDPE 1613.11 | 50% LDPE 132i + 49% Affinity PL1140 + 1% Process Aid | 60% LDPE 132I + 40% LLDPE 1613.11 |
| Inventive film 4 | 60% LDPE 132I + 40% LLDPE 1613.11 | 50% LDPE 132i + 49% Attane ™ 4203 + 1% Process Aid | 60% LDPE 132I + 40% LLDPE 1613.11 |

Film Process

All resins are blown into three layer films produced on a Dr. Collin blown film line and have a film structure as outlined above in Table 2. The blown film line parameters are shown in Table 3.

TABLE 3

| Blown Film Line Parameters | |
|---|---|
| Thickness | 50 μm |
| BUR | 3 |
| Layer Distribution | 25-50-25 |
| Output | 15 kg/h |
| Cooling Air T° | 12° C. |
| Die Gap | 1.8 mm |
| Die T° | 235° C. |
| T° Profile for Skin layers | 195° C.-225° C.-235° C.-235° C.-235° C. |
| T° Profile for Core layer | 180° C.-190° C.-220° C.-220° C.-220° C. |

The properties of the films are measured and shown below in Table 4.

TABLE 4

Film Properties

| Property | Units | Ref. film 1 | Inventive film 1 | Inventive film 2 | Inventive film 3 | Ref. film 2 |
|---|---|---|---|---|---|---|
| Shrink @ 120° C. (MD) | % | 2.00 | 30.00 | 23.20 | 29.00 | 23.00 |
| Shrink @ 130° C. (MD) | % | 30.00 | 40.00 | 61.60 | 60.00 | 56.40 |
| Shrink @ 140° C. (MD) | % | 60.00 | 63.00 | 64.40 | 68.40 | 64.00 |
| Shrink @ 150° C. (MD) | % | 68.50 | 70.00 | 69.60 | 68.00 | 68.80 |
| Shrink @ 120° C. (CD) | % | 0.00 | 0.00 | 0.00 | 2.00 | 0 |
| Shrink @ 130° C. (CD) | % | 5.00 | 15.00 | 20.00 | 20.00 | 10.80 |
| Shrink @ 140° C. (CD) | % | 10.00 | 29.00 | 23.60 | 25.00 | 20.40 |
| Shrink @ 150° C. (CD) | % | 25.00 | 30.00 | 22.,50 | 21.20 | 20.80 |
| Elastic recovery @ 50% (MD) | % | 42.44 | 52.95 | 51.6 | 53.8 | 45.06 |
| Elastic recovery @ 50% (CD) | % | 44.09 | 59.87 | 61.2 | 61.4 | 56.2 |
| Puncture Resistance | $J/cm^3$ | 11.14 | 18.63 | 14.8 | 18.1 | 18.05 |
| Elmendorf Tear resistance MD | g | 181 | 279 | 239 | 278 | 291 |
| Elmendorf Tear resistance CD | g | 613 | 719 | 716 | 745 | 950 |
| 2% Secant Modulus (MD) | MPa | 372.0 | 242.7 | 235 | 235 | 243.84 |
| 2% Secant Modulus (CD) | MPa | 418.1 | 243.1 | 245 | 255 | 272.79 |
| Elongation at break (MD) | % | 620 | 586 | 584 | 585 | 600 |
| Elongation at break (CD) | % | 784 | 720 | 775 | 805 | 740 |
| Load at break (MD) | MPa | 24.6 | 27.28 | 24.04 | 24.5 | 25.35 |
| Load at break (CD) | MPa | 25.86 | 28.38 | 27.2 | 27.9 | 27.44 |
| Yield Stress (MD) | MPa | 10.13 | 7.38 | 7.44 | 7.08 | 6.82 |
| Yield Stress (CD) | MPa | 11.29 | 7.36 | 7.4 | 6.64 | 6.57 |
| Gloss 45° | % | 47.26 | 48.7 | 54.8 | 53.4 | 55.76 |
| Haze | % | 13.26 | 12.26 | 10.4 | 10.66 | 10.15 |
| Clarity | % | 83.64 | 84.68 | 89.5 | 89.4 | 90.58 |

The results show that inventive films 1-3 have the same or better shrink behavior as compared to the reference films, but with improved elastic recovery. Also, the tensile properties, gloss, haze, and clarity are not adversely affected.

We claim:

1. A multilayer shrink film comprising:
a first layer comprising a first polymer blend, the first polymer blend comprising from 50 to 90 wt. % of a low density polyethylene having a density from 0.910 to 0.930 g/cc and an $I_2$ from 0.1 to 10 g/10 min, and from 10 wt. % to 50 wt. % linear low density polyethylene having a density from 0.910 to 0.940 g/cc and an $I_2$ from 0.5 to 10 g/10 min, based on the total polymer weight in the first polymer blend;
a second layer comprising a second polymer blend, the second polymer blend comprising from 0 to 60 wt. %, based on the total polymer weight in the second polymer blend, of a low density polyethylene having a density from 0.910 to 0.930 g/cc and an $I_2$ from 0.1 to 10 g/10 min, and from 40 to 100 wt. %, based on the total polymer weight in the second polymer blend, of an ethylene/α-olefin interpolymer composition having a density in the range of from 0.860 g/cc to 0.910 g/cc, a melt index ($I_2$) in a range of from 0.1 to 5 g/10 minutes, a molecular weight distribution ($M_w/M_n$) in the range of from 1.8 to 3.5, and a Comonomer Distribution Constant (CDC) in the range of from 95 to 200; and
a third layer comprising a third polymer blend, the third polymer blend comprising from 50 to 90 wt % of a low density polyethylene having a density from 0.910 to 0.930 g/cc and an $I_2$ from 0.1 to 10 g/10 min; and from 10 wt % to 50 wt % linear low density polyethylene having a density from 0.910 to 0.940 g/cc and an $I_2$ from 0.5 to 10 g/10 min, based on the total polymer weight in the third polymer blend;
wherein the second layer is positioned between the first layer and the third layer.

2. The multilayer shrink film according to claim 1, wherein the ethylene/α-olefin interpolymer composition has a vinyl unsaturation of less than 0.15 vinyls per one thousand carbon atoms present in the backbone of the ethylene/α-olefin interpolymer composition; and a zero shear viscosity ratio (ZSVR) in the range from 2 to 20.

3. The multilayer shrink film according to claim 1, wherein the first layer and the third layer independently have a thickness that is from 5-25 percent of the overall thickness of the multilayer shrink film.

4. The multilayer shrink film according to claim 1, wherein the second layer has a thickness that is from 50-90 percent of the overall thickness of the multilayer shrink film.

5. The multilayer shrink film according to claim 1, wherein the film has a thickness ranging from 20 to 75 microns.

6. The multilayer shrink film according to claim 1, wherein the ethylene/α-olefin interpolymer of the second layer has an $I_{10}/I_2$ from 6 to 12.

7. The multilayer shrink film according to claim 1, wherein the film exhibits at least one of the following properties:
a MD shrinkage higher than 20% at 120° C., according to ASTM D2732;
a MD shrinkage higher than 30% at 130° C., according to ASTM D2732;
a MD shrinkage higher than 50% at 140° C., according to ASTM D2732; or a MD shrinkage higher than 60% at 150° C., according to ASTM D2732.

8. The multilayer shrink film according to claim 1, wherein the film exhibits at least one of the following properties:
   a CD shrinkage higher than 10% at 130° C., according to ASTM D2732;
   a CD shrinkage higher than 20% at 140° C., according to ASTM D2732; or
   a CD shrinkage higher than 25% at 150° C., according to ASTM D2732.

9. The multilayer shrink film according to claim 1, wherein the film exhibits at least one of the following properties:
   an Elastic Recovery @ 50% MD elongation of at least 50%, according to ASTM D-5459; or
   an Elastic Recovery @ 50% CD elongation of at least 55%, according to ASTM D-5459.

10. The multilayer shrink film according to claim 1, wherein the film further comprises one or more additives selected from the group consisting of antiblocking agents, processing aids, slip agents, colors or pigments, and fillers.

11. A method of making the multilayer shrink film, wherein the method comprises:
   coextruding a first polymer blend, a second polymer blend, and a third polymer blend in an extruder to form a tube having a first layer formed from the first polymer blend, a second layer formed from the second polymer blend, and a third layer formed from the third polymer blend; and
   cooling the tube to form a multilayer shrink film; wherein the first polymer blend comprises from 50 to 90 wt. % of a low density polyethylene having a density from 0.910 to 0.930 g/cc and an $I_2$ from 0.1 to 10 g/10 min, and from 10 wt. % to 50 wt. % linear low density polyethylene having a density from 0.910 to 0.940 g/cc and an $I_2$ from 0.5 to 10 g/10 min, based on the total polymer weight in the first polymer blend; the second polymer blend comprises from 0 to 60 wt. %, based on the total polymer weight in the second polymer blend, of a low density polyethylene having a density from 0.910 to 0.930 g/cc and an $I_2$ from 0.1 to 10 g/10 min, and from 40 to 100 wt. %, based on the total polymer weight in the second polymer blend, of an ethylene/α-olefin interpolymer composition having a density in the range of from 0.860 g/cc to 0.910 g/cc, a melt index ($I_2$) in a range of from 0.1 to 5 g/10 minutes, a molecular weight distribution ($M_w/M_n$) in the range of from 1.8 to 3.5, and a Comonomer Distribution Constant (CDC) in the range of from 95 to 200; and the third polymer blend comprises from 50 to 90 wt % of a low density polyethylene having a density from 0.910 to 0.930 g/cc and an $I_2$ from 0.1 to 10 g/10 min; and from 10 wt % to 50 wt % linear low density polyethylene having a density from 0.910 to 0.940 g/cc and an $I_2$ from 0.5 to 10 g/10 min, based on the total polymer weight in the third polymer blend; and wherein the second layer is positioned between the first layer and the third layer.

* * * * *